(12) United States Patent
Brokaw et al.

(10) Patent No.: US 7,612,544 B2
(45) Date of Patent: Nov. 3, 2009

(54) LINEARIZED CONTROLLER FOR SWITCHING POWER CONVERTER

(75) Inventors: A. Paul Brokaw, Tucson, AZ (US); Marc J. Kobayashi, Oro Valley, AZ (US)

(73) Assignee: Analog Devices, Inc., Norwood, MA (US)

( * ) Notice: Subject to any disclaimer, the term of this patent is extended or adjusted under 35 U.S.C. 154(b) by 306 days.

(21) Appl. No.: 11/903,382

(22) Filed: Sep. 20, 2007

(65) Prior Publication Data

US 2009/0079405 A1    Mar. 26, 2009

(51) Int. Cl.
*G05F 1/10* (2006.01)
*G05F 1/652* (2006.01)

(52) U.S. Cl. ............ 323/222; 323/282; 323/284; 323/286

(58) Field of Classification Search ............ 323/222, 323/282, 284
See application file for complete search history.

(56) References Cited

U.S. PATENT DOCUMENTS

| | | | |
|---|---|---|---|
| 7,586,294 B2 * | 9/2009 | Endo ............... | 323/235 |
| 2006/0001410 A1 * | 1/2006 | Ishikawa et al. ........ | 323/282 |
| 2006/0192536 A1 * | 8/2006 | Chen et al. ............ | 323/222 |
| 2007/0024261 A1 * | 2/2007 | Wong et al. ............ | 323/288 |
| 2007/0057658 A1 * | 3/2007 | Hasegawa ............. | 323/282 |
| 2007/0069703 A1 * | 3/2007 | Kokubun et al. ........ | 323/282 |
| 2007/0090819 A1 * | 4/2007 | Hasegawa et al. ...... | 323/282 |

OTHER PUBLICATIONS

Erickson, Robert W. et al.; "Fundamentals of Power Electronics"; Second Edition; University of Colorado; Boulder, Colorado, Springer Science+Business Media, Inc.; 2001; pp. 132-133.
Dixon, Lloyd H. , Jr.; "Switching Power Supply Topology Review"; Topic 1; Unitrode Corporation; Lexington, MA; 2001; pp. 1-12.

* cited by examiner

*Primary Examiner*—Bao Q Vu
(74) *Attorney, Agent, or Firm*—Koppel, Patrick, Heybl & Dawson (57) ABSTRACT

A linearized controller to operate a switching power converter which includes an inductor having its first terminal coupled to a first voltage (V1) and its second terminal switched so that it alternately connects to a second, higher voltage (V2) or to a common terminal. A sawtooth voltage generator produces a ramp voltage ($V_{ramp}$) having a period T and an amplitude which varies in response to a control voltage Vx, and a voltage comparator which compares $V_{ramp}$ to a control voltage Vy. The comparator output controls the switching such that T is divided into intervals t1 and t2, during which the second terminal is connected to the common terminal or to V2, respectively. When Vy is maintained in a fixed proportion to V1, V2 is driven to be in the same proportion to Vx, independently of changes in V1, providing a boost converter. A buck converter is similarly realized.

18 Claims, 9 Drawing Sheets

LINEARIZED CONTROLLER FOR SWITCHING POWER CONVERTER

BACKGROUND OF THE INVENTION

1. Field of the Invention

This invention relates generally to the switching power converters, and more particularly, to circuits and methods for controlling the switching of such converters.

2. Description of the Related Art

Switching power converters can be configured using a number of different topologies, and can be controlled with a wide variety of control methods. For example, a switching converter can be configured as a buck, boost, or flyback converter, and may be operated in discontinuous or continuous inductor current modes. Known control methods include direct duty cycle control, voltage feedforward, and current mode. A discussion of known switching converter topologies and control methods can be found, for example, in "Switching Power Supply Topology Review", L. Dixon Jr., Unitrode Corp., pp. 1-1 to 1-12 (2001).

Regulation of a switching converter is generally accomplished by varying the duty cycle (D) of the signal operating the converter's switching element. In the case of a buck converter, for example, the output voltage $V_{out}$ is given by D times the input voltage $V_{in}$ provided to the converter; thus, $V_{out}$ tracks $V_{in}$ unless D is adjusted, with $V_{out}=(1/D)*V_{in}$.

The typical voltage-to-duty ratio converter compares a control voltage to an invariant ramp so that D is linearly proportional to the applied voltage. In the case of a buck converter, this results in linear control overall, but the control voltage must be changed to accommodate changes in input voltage. In the case of a boost converter using the same sort of voltage-to-duty ratio converter, the output voltage varies hyperbolically with the input to the duty ratio controller.

Feedback is usually employed to stabilize the output voltage of either type converter. However, there is a conflict between the desire for high loop gain to reduce errors, and the necessity to limit and control loop gain to assure stability in the frequency domain. This conflict is made more difficult to resolve by the gain which must be added to accommodate a varying input voltage in order to preserve a predetermined error. Moreover, in the case of a boost converter, the loop gain varies hyperbolically with the duty ratio control voltage, due to the 1/D dependence of the output on D.

A technique commonly called "feedforward" can be used to modify the response of the typical linear voltage-to-D controller, but the more serious hyperbolic gain problem in the boost converter is not so addressed and is generally dealt with by reducing the overall gain to make the loop stable at the highest gain level, while permitting more error at the lowest level.

SUMMARY OF THE INVENTION

A linearized controller for a switching power converter is presented. The present controller is used to operate a power converter which includes an inductor having its first terminal coupled to a first power voltage (V1) and its second terminal switched so that it alternately connects to a second, higher, power voltage (V2) or to a circuit common terminal. The controller comprises a sawtooth voltage generator which produces a ramp voltage ($V_{ramp}$) having a period T and an amplitude which may be varied in response to a first control voltage (Vx), and a voltage comparator arranged to compare $V_{ramp}$ to a second control voltage (Vy). The output of the comparator controls the switching of the second inductor terminal so as to divide period T into a first interval (t1) during which the second terminal is connected to the circuit common terminal, and a second interval (t2) during which the second terminal is connected to V2.

The controller is arranged such that, when Vy is maintained in a fixed proportion to V1, V2 will be driven so as to be in the same proportion to Vx, independently of changes in V1. Alternatively, when Vx is maintained in a fixed proportion to V2, V1 will be driven to be in the same proportion to Vy, independently of changes in V2.

The present controller can be operated in an open loop configuration, or a feedback loop can be added to correct for errors present in the open loop function. Either buck or boost converters can be realized.

These and other features, aspects, and advantages of the present invention will become better understood with reference to the following drawings, description, and claims.

DETAILED DESCRIPTION OF THE INVENTION

The present invention concerns a linearized controller for a switching power converter. The controller is linearized in the sense that the portion of the controller which converts an amplified error signal to a duty ratio adjusts the duty ratio to cause the output to change in direct and fixed proportion to the amplified error signal. One input to the duty ratio controller is the converter's input voltage, and this information is included in the making of the duty ratio, so that the output voltage is unaffected by changes to the input voltage. The controller can, to first order, be treated as an open loop controller that makes the converter output proportional to a control voltage, independently of the power input voltage. A feedback loop is preferably added to the open loop controller to correct for the errors in the open loop function; this control function is valuable since it stabilizes the loop gain and lowers the gain that may be required for a given level of precision.

Operating Principle

Figure 1:
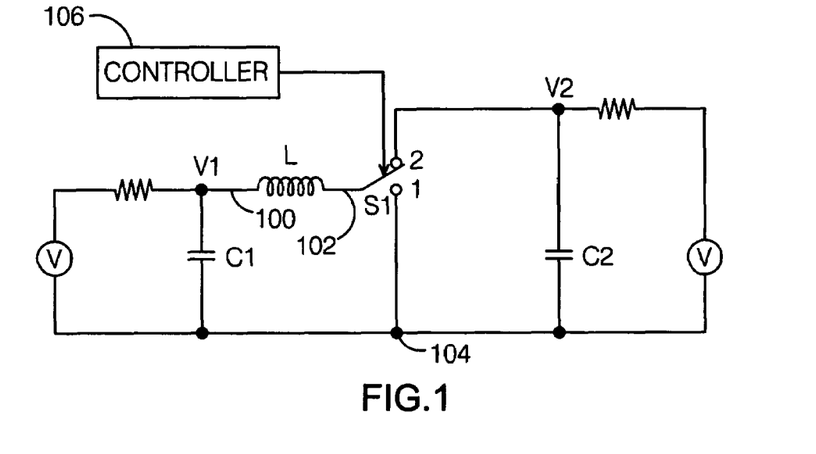
FIG. 1 is a schematic diagram illustrating the principles of a switching power converter operated with a controller per the present invention.

FIG. 1 shows a general power converter scheme that may be applied for either a buck or boost converter. An inductor L has its first terminal 100 coupled to a first power voltage V1 and its second terminal 102 switched via a switch S1 so that it alternately connects to a second, higher, power voltage V2 or to a common terminal 104 of the two power voltages. The switching is controlled by a controller 106 as described herein.

For purposes of illustration, two voltage sources are shown for generality. In most cases, one of the sources will be zero and its associated resistor will be the load for the converter. When the switch is driven as described herein, V2 will be the larger and V1 the smaller of two voltages.

Figure 2:
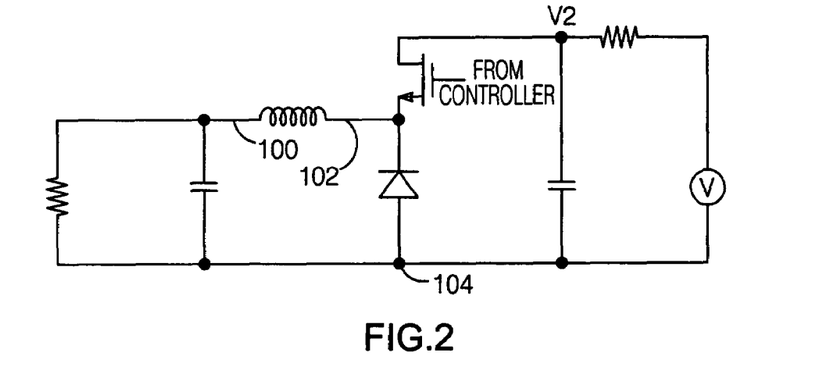
FIG. 2 is a schematic diagram showing how the converter of FIG. 1 might be configured as a buck converter.
Figure 3:
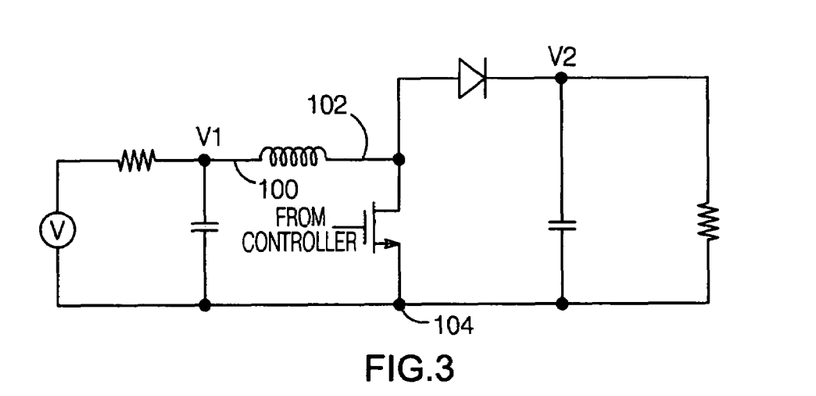
FIG. 3 is a schematic diagram showing how the converter of FIG. 1 might be configured as a boost converter.

In a synchronous converter, both switch positions (1 and 2) would be realized with respective transistor switches. Alternatively, if switch position 2 was a transistor and switch position 1 a suitably connected diode, a buck converter is provided transforming a higher voltage V2 to a lower one V1. This arrangement is illustrated in FIG. 2. Or, if switch position 1 were a transistor and switch position 2 a suitably connected diode, a boost converter is formed which provides a higher load voltage, V2, from a lower input voltage V1; this arrangement is shown in FIG. 3.

Assume two time intervals, t1 and t2, which are the times for which S1 is in position 1 and position 2, respectively. Also assume that, while they do not overlap, the switch is always in one of the two positions, such that the converter operates in continuous current mode. Then, the period of operation, T, is given by the sum of t1 and t2.

If capacitors C1 and C2 are so large that there is negligible ripple at the frequency (1/T) and current levels involved, and if t1 and t2 are held constant, an equilibrium will be reached as given by:

$$V1*t1=(V2-V1)*t2$$

$$V1*(t1+t2)=V2*t2$$

$$V2=V1*(t1+t2)/t2$$

And since $T=t1+t2$, $$V2=V1*(T/t2)$$

These equations are based on the idea that the time the switch is in position 1 and the inductor current is ramping up in proportion to V1 must be exactly balanced by the time the switch is in position 2 with the inductor current ramping back down in proportion to V2−V1 (positive voltages are assumed). Thus, at equilibrium, the ramp up of current during t1 with V1 applied must be exactly matched by the ramp down during t2 with V2−V1 applied. If the endpoint of these ramps failed to match, successive cycles would start with different currents, which would change one or both of the voltages, until a steady state was reached.

These equations describe a relationship amongst the variables V1, V2, t1, and t2 from which the value of one can be determined from the other three, and a relationship between V1 and V2 can be set by the choice of t1 and t2. For example, the last equation shows that V2=V1*T/t2, so that for a given value of V1 a desired value of V2 can be obtained by properly selecting t1 and t2. This can be used to set V2 at a desired value for a range of values of V1.

Figure 4:
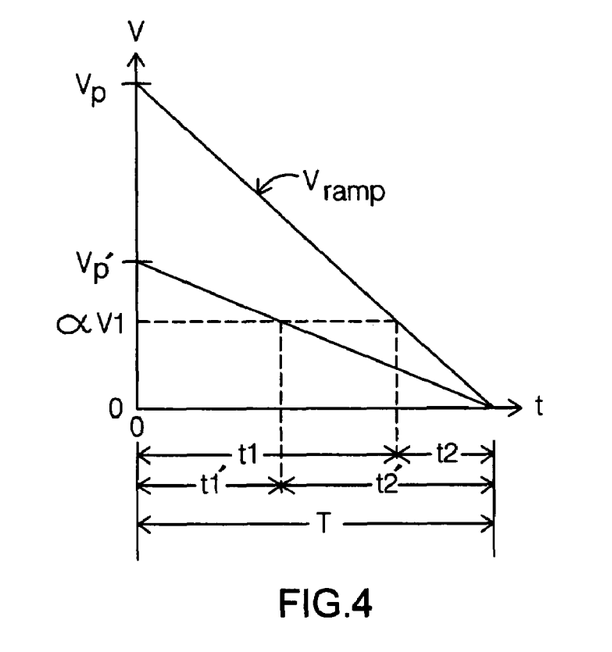
FIG. 4 is a diagram illustration the operation of a controller per the present invention.

Keeping these relationships in mind and referring now to FIG. 4, suppose that a voltage ramp ($V_{ramp}$) is made which starts at a value Vp at time zero and ramps down to 0V in a time defined to be T. Period T is separated into time intervals t1 and t2 by taking a proportion, α, of the input voltage V1 and comparing it to the voltage ramp; time t1 occurs while $V_{ramp} > \alpha*V1$, and time t2 occurs while $V_{ramp} < \alpha*V1$.

Moving the starting value from Vp to Vp' affects the durations of t1 and t2. If these intervals are used to control the switch of FIG. 1:

$$Vp=\alpha*V2, \text{ or } V2=Vp/\alpha.$$

Although not necessary, it is convenient for α to be less than one, so that V1 and V2 can both be larger than the amplitude of the ramp.

Since the relationship V2=Vp/α does not contain the voltage V1, the arrangement which generates t1 and t2 makes V2 linearly proportional to the ramp starting voltage, without regard to the value of V1, and makes the "gain" of the Vp to V2 conversion equal to 1/α. This ramp generator-comparator arrangement is the basis of the open loop portion of the present linearized controller.

Note that factors neglected in this discussion of operating principles will act to cause V2 to differ slightly from the calculated value. For example, the unavoidable series resistance in the inductor will cause voltage V2 to be sensitive to the load presented by the associated resistor (assuming a boost converter configuration). This can be overcome by comparing a feedback signal derived from V2 with a reference voltage to generate an error signal which is used to set Vp. In this way, the output can be stabilized at a chosen voltage over a range of loading and input voltages. The feedback circuitry needs only to set Vp and to correct for various effects neglected in the description, and so less actual loop gain will be required and its variability will be minimized.

Figure 5:
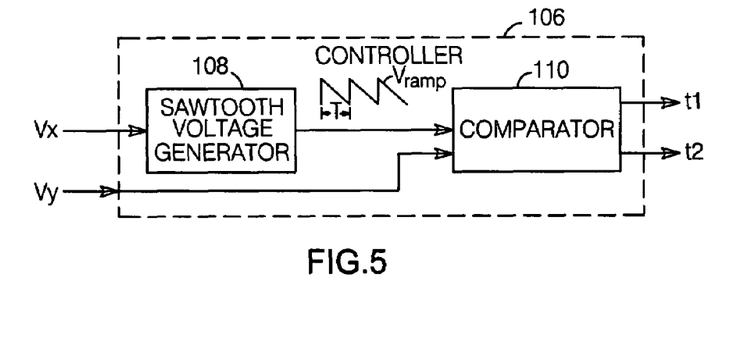
FIG. 5 is a block diagram of a controller per the present invention.

A generalized controller 106 for a power conversion circuit in accordance with the present invention is shown in FIG. 5. The controller includes a sawtooth voltage generator 108 which produces ramp voltage $V_{ramp}$ having a period T and an amplitude which may be varied in response to a first control voltage Vx; and a voltage comparator 110 arranged to compare $V_{ramp}$ to a second control voltage Vy. Referring back to FIG. 1, the comparator is arranged to control the switching of second inductor terminal 102 so as to divide period T into first interval t1 during which the second terminal is connected to common terminal 104, and second interval t2 during which the second terminal is connected to V2. The controller is arranged such that when Vy is maintained in a fixed proportion to V1, V2 will be driven so as to be in the same proportion to Vx, independently of changes in V1, and alternatively when Vx is maintained in a fixed proportion to V2, V1 will be driven to be in the same proportion to Vy, independently of changes in V2.

Figure 6:
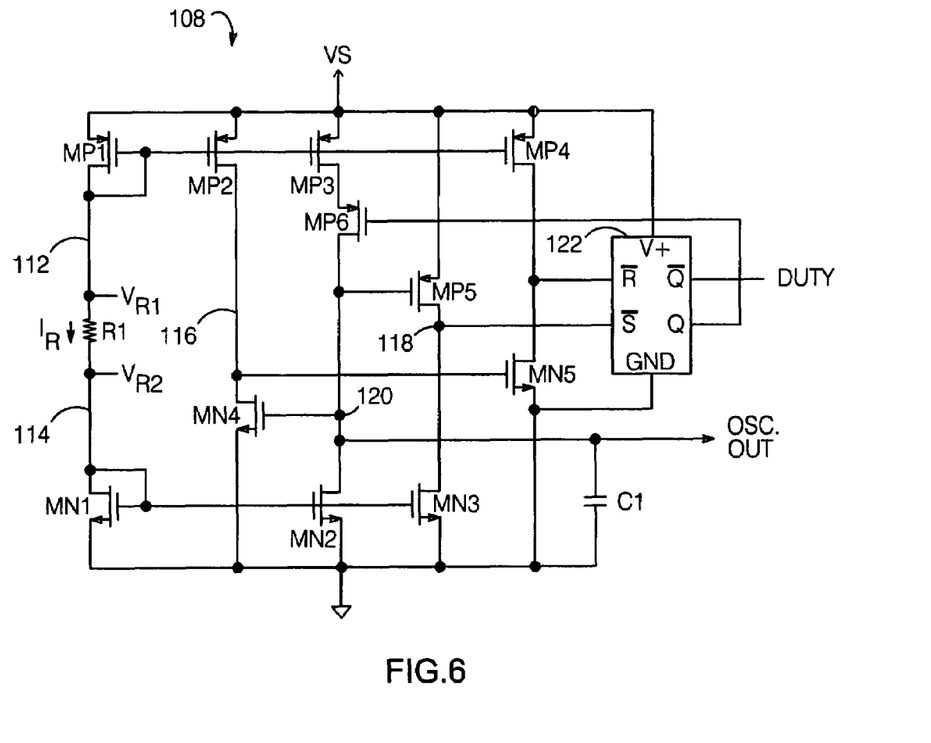
FIG. 6 is a schematic diagram of a sawtooth voltage generator as might be used with a controller per the present invention.

One possible embodiment of sawtooth voltage generator 108 is shown in FIG. 6. Though it is not essential to provide a ramp voltage having a fixed period T, it is preferred that sawtooth voltage generator 108 provide a ramp having a slope proportional to its amplitude, so that period T will be invariant with changes in Vp. An oscillator with this property is shown in FIG. 6. The circuit includes a P-type current mirror comprising an input transistor MP1 and output transistors MP2, MP3 and MP4, and an N type current mirror comprising an input transistor MN1 and output transistors MN2 and MN3. A resistor R1 is connected between input transistors MP1 and MN1, such that each is driven by the current ($I_{R1}$) in R1. $I_{R1}$ will be proportional to the voltage from node 112 ($V_{R1}$) to 114 ($V_{R2}$) across R1. The current from the MP1/MP2 mirror drives a transistor MN4. The size of MN4 with respect to MN1 is preferably in the same ratio as the size of MP2 with respect to MP1; when so arranged, the current per unit width in MN1, due to R1, is mirrored into MN4 at the same density, so that the voltage at the drain of MN4 (node 116) will switch low to high as the gate voltage (node 120) of MN4 falls below a level equal to $V_{R2}$ at node 114.

Similarly, the current from the MN1/MN3 mirror drives a transistor MP5. The size of MP5 with respect to MP1 is preferably in the same ratio as the size of MN3 with respect to MN1, such that the voltage at the drain of MP5 (node 118) will switch high to low as the gate voltage (node 120) of MP5 rises above a voltage equal to $V_{R1}$ at node 112.

The gates of FETs MN4 and MP5 are connected to a node 120. When arranged as described above, when the gate of MN4 is below $V_{R2}$, its drain will be pulled high by current from MP2, and if the gate is above $V_{R2}$ it will sink all the MP2 current and pull node 116 low. In this way, the gate of MN4 serves as a comparator to detect when a varying voltage crosses $V_{R2}$. Similarly, the gate of MP5 can be used to detect voltages crossing $V_{R1}$.

The oscillator also includes a capacitor C1 connected between node 120 and circuit common, and components to provide current to charge/discharge C1 so that node 120 can be made to ramp up or down. FET MN2 is preferably scaled to MN1 and connected to deliver to C1, at node 120, a discharging (high to low) current proportional to the voltage across R1. A second mirror implemented with FET MP3 biased by MP1 provides a charging current to C1 at node 120; in the exemplary embodiment shown, that current is blocked or allowed to flow to node 120 by a FET MP6 which is operated to control the charge/discharge of C1. The oscillator's sawtooth waveform is provided at node 120.

The circuit also includes an inverter composed of MP4 and a FET MN5 having its gate connected to node 116, which inverts the signal from node 116, and an $\overline{RS}$ flip-flop 122 having its $\overline{R}$ and $\overline{S}$ inputs connected to the inverter output and to node 118, respectively. The Q output of flip-flop 122 drives MP6, and its $\overline{Q}$ output (DUTY) marks the end of one cycle at its rising edge, and the beginning of the next cycle with its falling edge. The operation of the oscillator is illustrated in the simulated timing diagram shown in FIG. 7, which shows $V_{R1}$ and $V_{R2}$, along with the signals at nodes 116, 118, 120 and DUTY (each of which is denoted as "V(XXX)") for an increasing value of rail voltage VS. Current from MN2 causes node 120 to ramp down, and the response of MP5 and MN4, the two comparators, is shown. Ideally, nodes 116 and 118 switch exactly as node 120 crosses $V_{R2}$ and $V_{R1}$, respectively.

Figure 7:
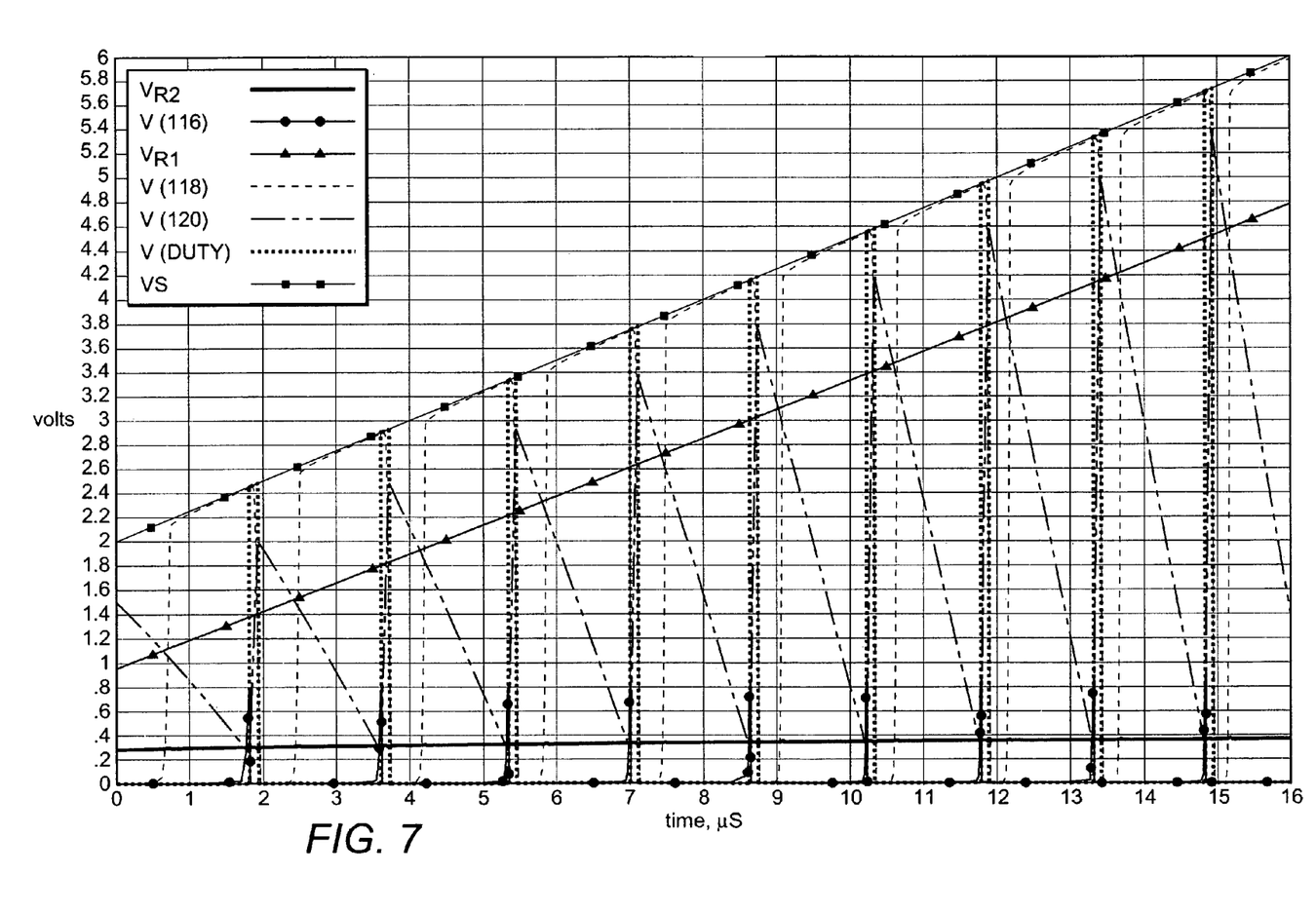
FIG. 7 is a timing diagram illustrating the operation of a sawtooth voltage generator as might be used with a controller per the present invention.

It is important that the slope of the node 120 voltage is proportional to $I_{R1}$, which is itself proportional to the voltage across R1. Since the two trip thresholds are separated by that same voltage, if the charging direction is reversed as the ramp crosses the thresholds, the time it takes the ramp to cycle should be independent of the actual voltage across R1. MP6 is turned on when node 120 reaches the lower threshold, and off after it reaches the upper one. In FIG. 7, voltage VS is swept from 2V to 6V and the R1 voltage changes from about 0.75V to about 4.75V. Despite several errors, including positive overshoot due mostly to the response speed of the comparators, the period of oscillation remains essentially constant over this considerable range of amplitudes for the node 120 waveform. The change in amplitude with VS is compensated by a clearly changing slope as one moves from left to right across the plot. Additional details concerning the operation of sawtooth voltage generator 108 can be found in co-pending patent application Ser. No. 11/280,516.

The oscillation is sustained as follows. When node 120 is above the lower threshold and flip-flop 122 is set (Q is high), MP6 is held off and the MN2 current causes node 120 to ramp down. When node 120 reaches the lower threshold, approximately equal to $V_{R2}$, node 116 will rise and this signal, inverted by MN5 and MP4, will reset the flip-flop. When Q goes low, MP6 will come on and convey the current of MP3 to C1. MP3 is preferably comparable in width and much shorter in length than MP1, so it develops a large current that overpowers MN2 and quickly pulls up node 120.

Flip-flop 122 holds MP6 on until node 120 crosses the upper threshold set by MP5 at approximately $V_{R1}$. When MP5 goes off, the flip flop is set by the negative swing at its drain. This turns off MP6 and node 120 ramps down again. In this way, a variable amplitude fixed frequency ramp voltage which implements the concept shown in FIG. 2 is provided.

Figure 8:
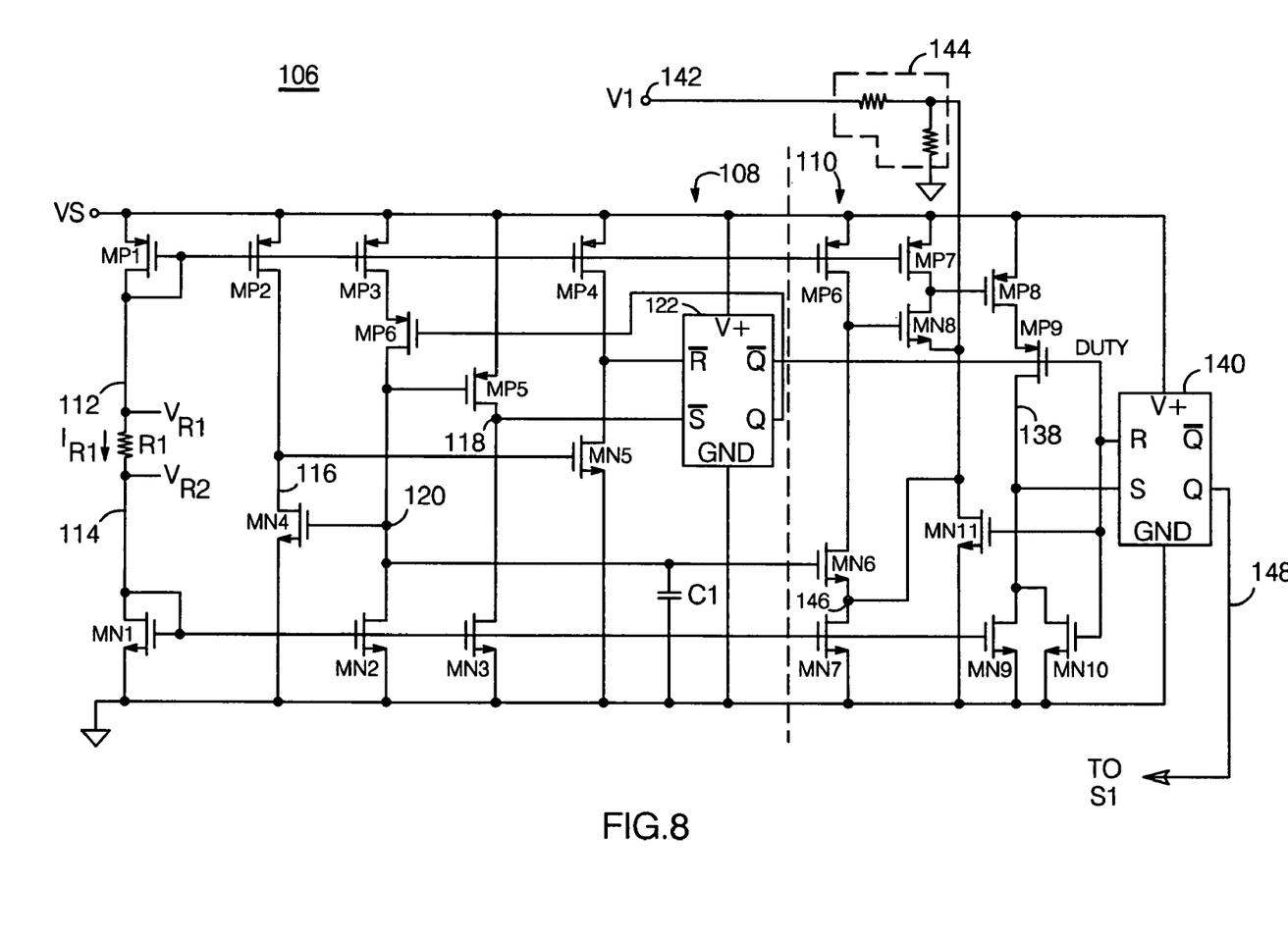
FIG. 8 is a schematic diagram of a sawtooth voltage generator and comparator as might be used with a controller per the present invention.

Controller 106 also includes a comparator 110, to compare the ramp voltage with a control voltage as described above. The schematic of FIG. 8 illustrates one possible embodiment of comparator 110 along with the embodiment of sawtooth voltage generator 106 just described.

The comparator includes a FET MN6 having its gate connected to node 120, and which is supplied with current from a FET MP6 which forms a current mirror with MP1. MN6 and MP6 are preferably half the widths of MN1 and MP1, respectively, so that the Vgs of MN6 is about the same as the Vgs of MN1 when its drain current just matches that of MP6. The source of MN6 is driven by a FET MN7 which forms a current mirror with MN1, and provides approximately the same current as MP6. A FET MN8 has its gate connected to the junction of MN6 and MP6, and receives current via a FET MP7 which forms a current mirror with MP1. When so arranged, MN6 operates as a sort of cascode for the MN7 current driving the gate of MN8, with the gate of MN8 being very sensitive to the current delivered by MN6.

The junction of MP7 and MN8 is connected to the gate of a FET MP8, the current in which is conducted to a node 138 via a FET MP9 which is operated by the DUTY output of flip-flop 122 and biased by a FET MN9 which forms a current mirror with MN1. The DUTY output is also connected to the R input of a flip-flop 140, to the gate of a FET MN10 connected between node 138 and ground, and to the gate of a FET MN11 connected between node 146 and ground. Node 138 is connected to the S input of flip-flop 140.

Input voltage V1 (or a voltage which represents V1) is applied to a node 142, which is connected to the input of a voltage divider 144; the output of divider 144 is connected to a node 146 at the source of MN6. The ratio provided by divider 144 is the α of FIG. 2, determining the fraction of V1 that will be compared to the ramp voltage at node 120.

When the ramp voltage at node 120 is only slightly above the sum of the divider voltage at node 146 and the nominal Vgs of MN6, the current in MN6 will rise above that from MN7 as it tries to pull up the divider. As a result, the drain of MN6 will pull the drain of MP6 and the gate of MN8 low, since the MN6 current is greater than the MN7 current which is nominally the same as the MP6 current.

If the ramp voltage at node 120 now falls, the current in MN6 will go through neutral to less than that in MP6 so that the gate of MN8 will be pulled up. As MN8 begins to come on, it will get some current from MP7, which up to this point has only been holding the gate of MP8 high. This current pulls up on node 146 and provides positive feedback around MN6, stealing more of its available current and causing MN8 to be driven on even harder. This will turn on MP8 and, by way of MP9, will set flip-flop 140. The Q output 148 of flip-flop 140 is connected to effectively hold switch S1 in switch position 2 until it is reset by DUTY, which will also turn on MN10 to quickly reset the MN6 comparator.

This additional thresholding does not interfere with the oscillator, but it does define the end of t1 and the start of t2. Ideally, the end of t2 and of T should coincide with the start of the next t1. This is because FIG. 2 neglects the rise time of the oscillator, which is not zero. When the ramp voltage at node 120 reaches the bottom threshold, it is reset to a higher voltage in a short time indicated by the pulse at DUTY. If t1 is started after DUTY, the resulting error is corrected by the feedback.

Figure 9:
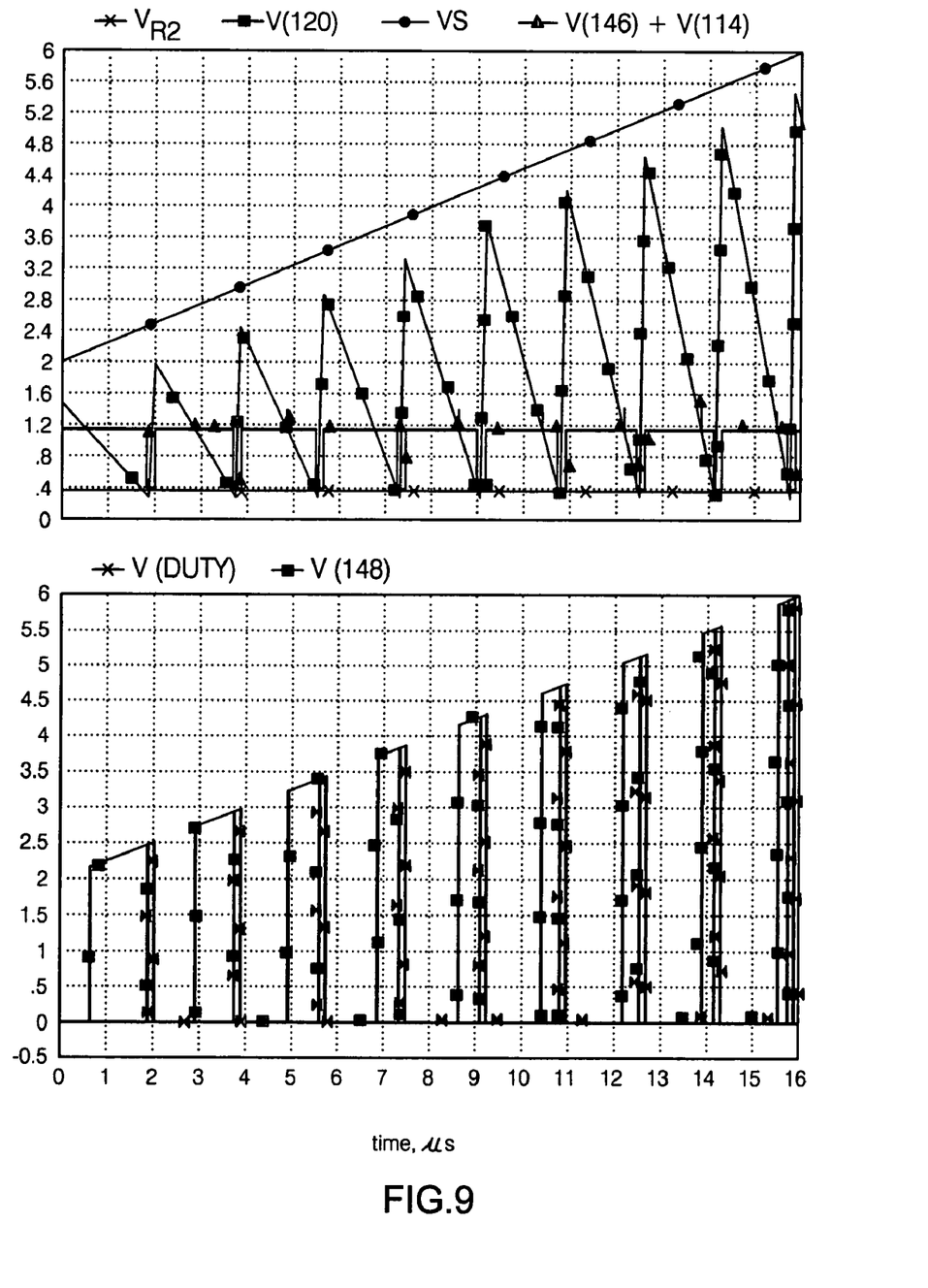
FIG. 9 is a timing diagram illustrating the operation of a sawtooth voltage generator and comparator as might be used with a controller per the present invention.

The operation of the oscillator and comparator is illustrated in the simulated timing diagram shown in FIG. 9, which shows the signals at nodes 120, DUTY and 148 as VS is swept from 2V to 6V. It also shows the lower ramp threshold (the voltage $V_{R2}$ at node 114), and the sum of the voltages at nodes 146 and 114—i.e., the voltage at the divider offset by the lower oscillator threshold. The Q output of flip-flop 140—V (148)—marks the end of t1 and will be gated with DUTY to control the time that switch S1 is in switch position 2. It should be apparent that, although the oscillator frequency is nearly unchanged by changes in VS, the duty ratio defined by the two signals shown in the lower plot of FIG. 9 changes in response to it. This change is consistent with the implications of FIG. 2.

Figure 10:
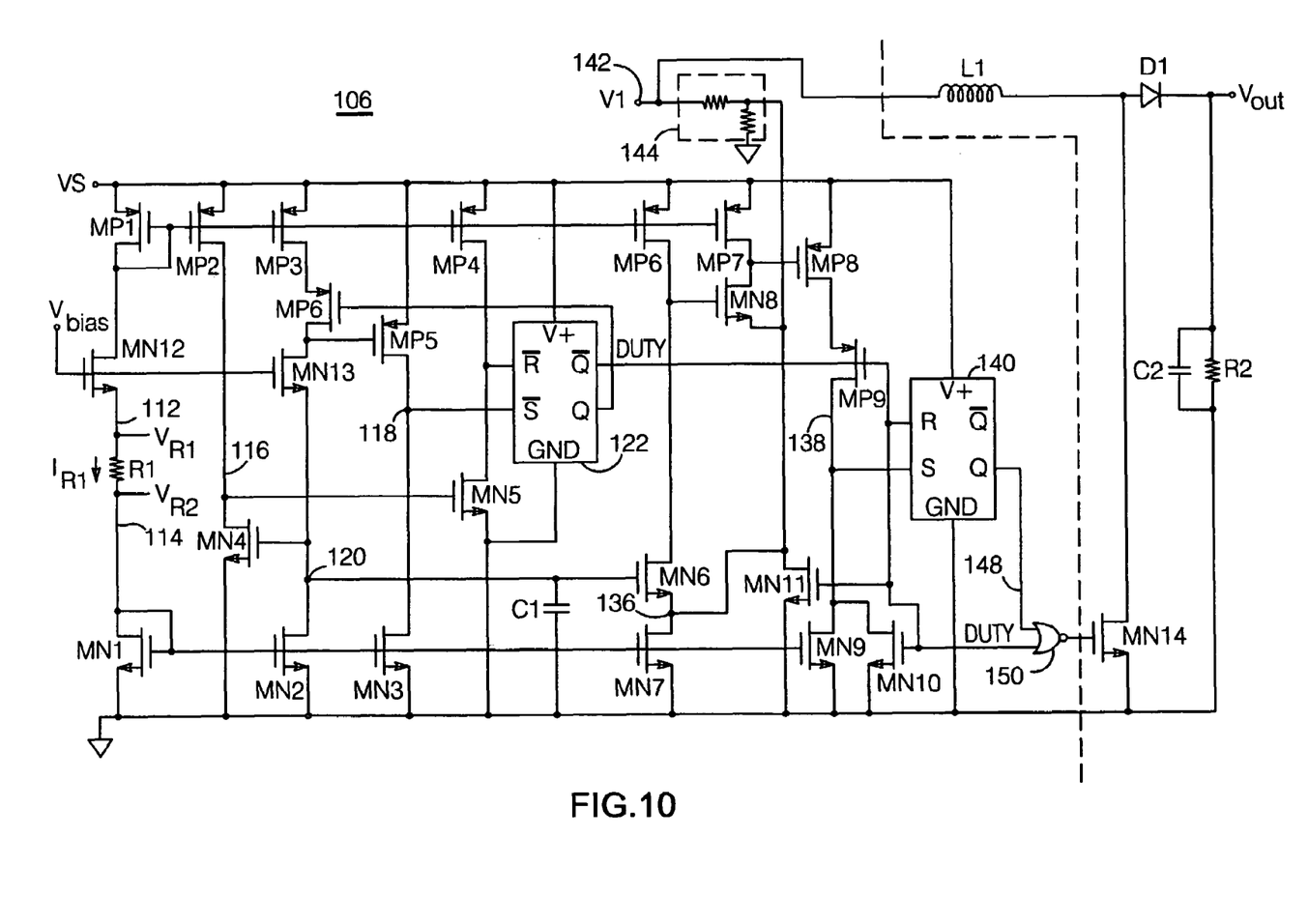
FIG. 10 is a schematic diagram illustrating one possible embodiment of a switching power converter employing a controller per the present invention.

An embodiment of a switching power converter configured as a boost converter, which includes a controller in accordance with the present invention, is shown in FIG. 10. Here, the converter is configured for open loop operation.

Controller 106 is similar to that shown in FIG. 8, except here there is a FET MN12 connected between MP1 and node 112, and a FET MN13 connected between MP6 and the gate of MP5 and node 120. These two new transistors have a common gate which is driven with a voltage identified as $V_{bias}$. When so arranged, peak ramp voltage Vp is established by $V_{bias}$, rather than by the value of VS as in FIG. 8. A description of this functionality follows.

Suppose that $V_{bias}$ is at 2-3 volts, and that MP6 is off. Then MN13 will have positive gate bias but no access to current and node 120 can pull both the source and drain of MN13 low as node 120 falls due to the MN2 current. This turns on MP5, as it would in the FIG. 8 circuit.

Now suppose node 120 reaches the bottom of its range and MN4 ends that part of the cycle as described above. When MP6 comes on, a large current will become available to MN13, which will start to rapidly charge C1. When node 120 reaches a voltage equal that at the top of R1 ($V_{R1}$), however, MN13 will be biased to a state where it no longer supplies the large current demanded by MP3 by way of MP6. As soon as this current drops, the drain of MN13 will be pulled up by the large current and MN5 will be switched off. When MN5's drain falls, the oscillator is reset as before, with MP6 going off and MN2 causing node 120 to start to ramp low again.

Notice that the point at which this reset is initiated is when node 120 reaches the same level as $V_{R1}$. Moreover, the current in R1 is conveyed by MN12 to MP1, so that the p-type mirrors operate at the R1 current. This means that VS can be made a fixed voltage, and the peak value of the voltage at node 120 can be controlled by the $V_{bias}$ voltage applied to MN12 and MN13. But since the lower threshold for node 120 remains the same as in FIG. 8, and the upper threshold tracks the voltage across R1, the frequency of operation remains essentially unchanged with changes in $V_{bias}$. Thus, by employing MN12 and MN13 in this way, it is no longer necessary to change the whole supply to change the node 120 peak, but only to drive the common gates of MN12 and MN13. This allows everything else in the converter to run from VS.

The implementation shown in FIG. 10 also includes a NOR gate 150 which combines the Q output 148 from flip-flop 140 with DUTY. The output of the NOR, which is normally high whenever both Q output 148 and DUTY are low, controls the boost switch—here, a FET MN14. MN14 drives an inductor L1 and diode D1 to produce the converter's output voltage $V_{out}$ and thereby charge the load capacitance (C2) and resistance (R2); L1, D1, C2 and R2 would typically be off-chip application components.

Figure 11:
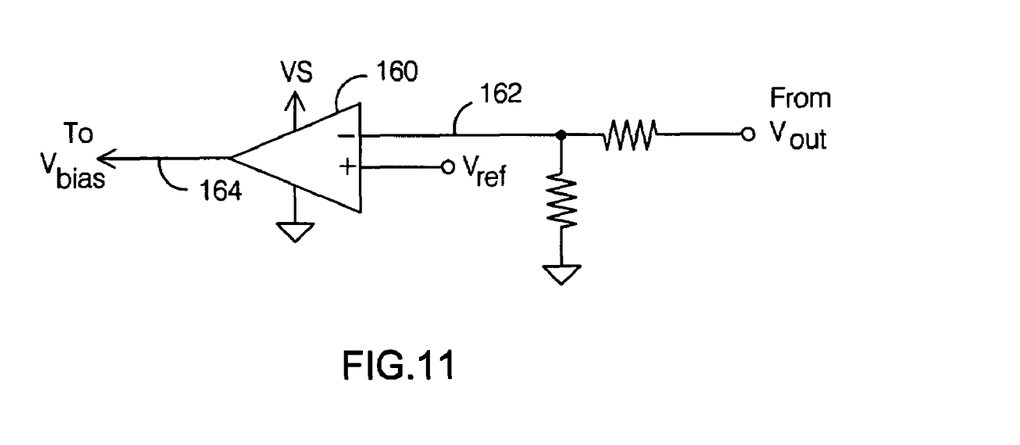
FIG. 11 is a schematic diagram of components that could be added to a converter such as that shown in FIG. 10 to provide closed loop control of the converter's output voltage.

Closed loop feedback can be used to stabilize $V_{out}$ at a desired voltage. One example, which provides voltage-mode control of the converter, is shown in FIG. 11: an amplifier 160 receives a signal 162 which varies with $V_{out}$, and a system reference voltage $V_{ref}$ which represents the desired output voltage. The output 164 of amplifier 160 sets the $V_{bias}$ voltage and thereby the peak value of the ramp voltage at node 120. Amplifier 160 is preferably a Gm amplifier or OTA, to which loop frequency compensating components may be added.

Alternatively, closed loop feedback which implements current-mode control of the converter may be employed to stabilize $V_{out}$ at a desired voltage. There are numerous known methods by which this may be implemented. Typically, known circuitry is used to generate a small sample of the switch current (e.g., the current in MN14 for the embodiment shown in FIG. 10), which is used to drive node 146 at the junction of the resistors forming divider 144. This current disturbs α*V1, causing the feedback voltage setting $V_{ramp}$ to increase when the current in inductor L1 increases, thereby achieving current-mode control.

Note that the linearized controller scheme can be implemented such that the ramp voltage steps up and ramps back down as described above, or steps down and ramps back up. The difference in implementation would be that, referred to time zero, the order of t1 and t2 would be reversed, with t2 preceding t1. This might be preferable in some applications, or for some alternate implementation.

A convenience feature of the present controller scheme is that the maximum duty ratio limiting which must be incorporated into a boost controller arises automatically in the architecture. So long as the fraction of the input voltage (α*V1) is selected to be reliably large enough to operate the comparator, t2 will never be zero, no matter how high Vp is driven on a transient basis. This automatic limiting of the switch on-time does not naturally occur in many prior architectures, and must be provided at the cost of some circuitry.

Figure 12:
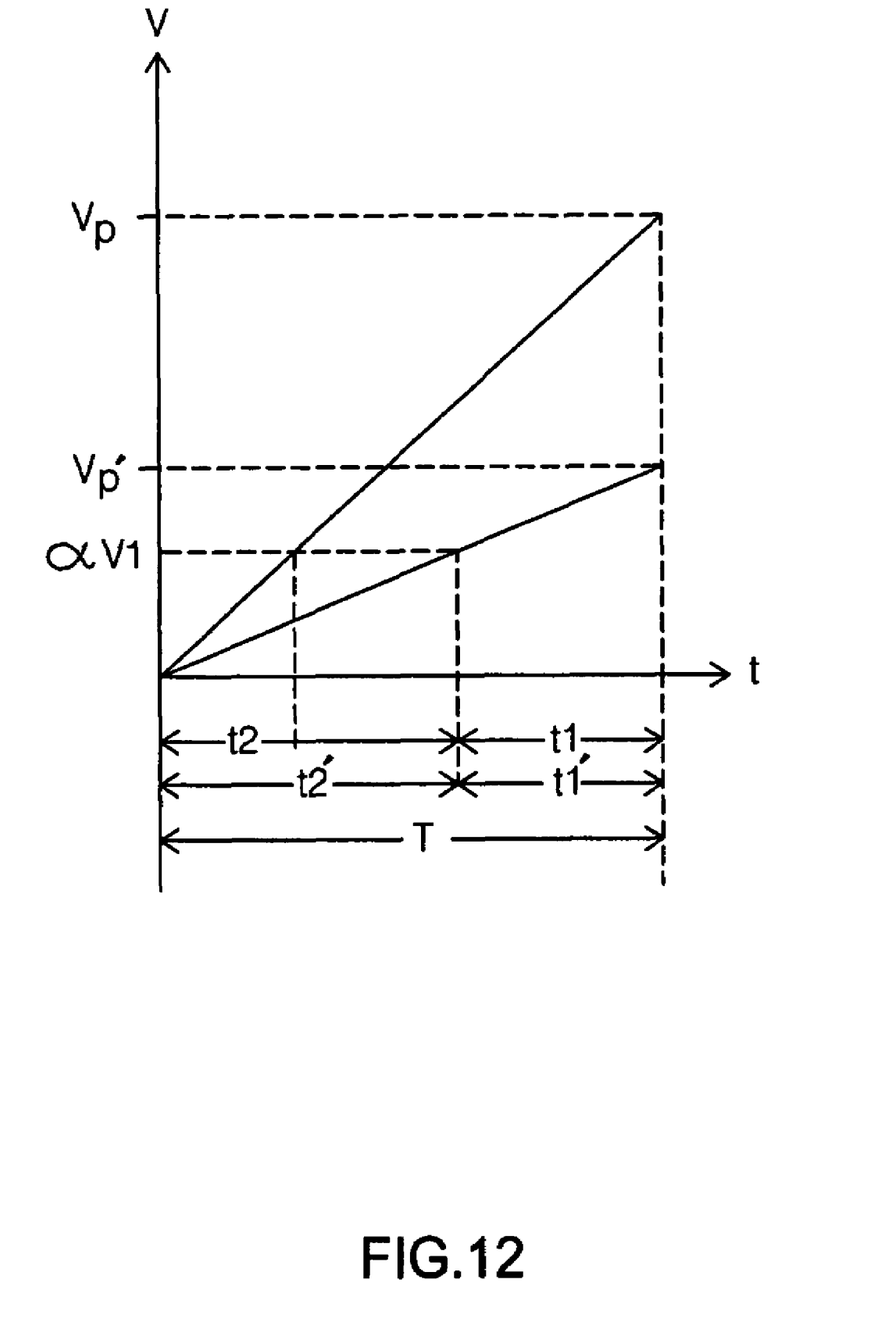
FIG. 12 is a diagram illustration the operation of another possible embodiment of a controller per the present invention.

The description above primarily discusses a boost controller. However, a buck controller can also be based on this scheme by interchanging the roles of V1 and V2. If, in the oscillator, Vp is made to track α*V2 applied as an input voltage, then the duty ratio determined by α*V1 will control V1 which takes on the role of output. To close the loop, V1 should be compared to the reference voltage (through a voltage divider as needed), and the amplified error would drive the input of a comparator to the required trip voltage (Vcomp). In this case, a ramp starting from zero and making t2 the first interval would be closer to usual practice of closing the switch to connect the inductor to the higher of the two voltages, at time zero; this is illustrated in FIG. 12. However, as in the case of the boost, either ramp starting point could be used as simplicity or convenience may dictate.

Figure 13:
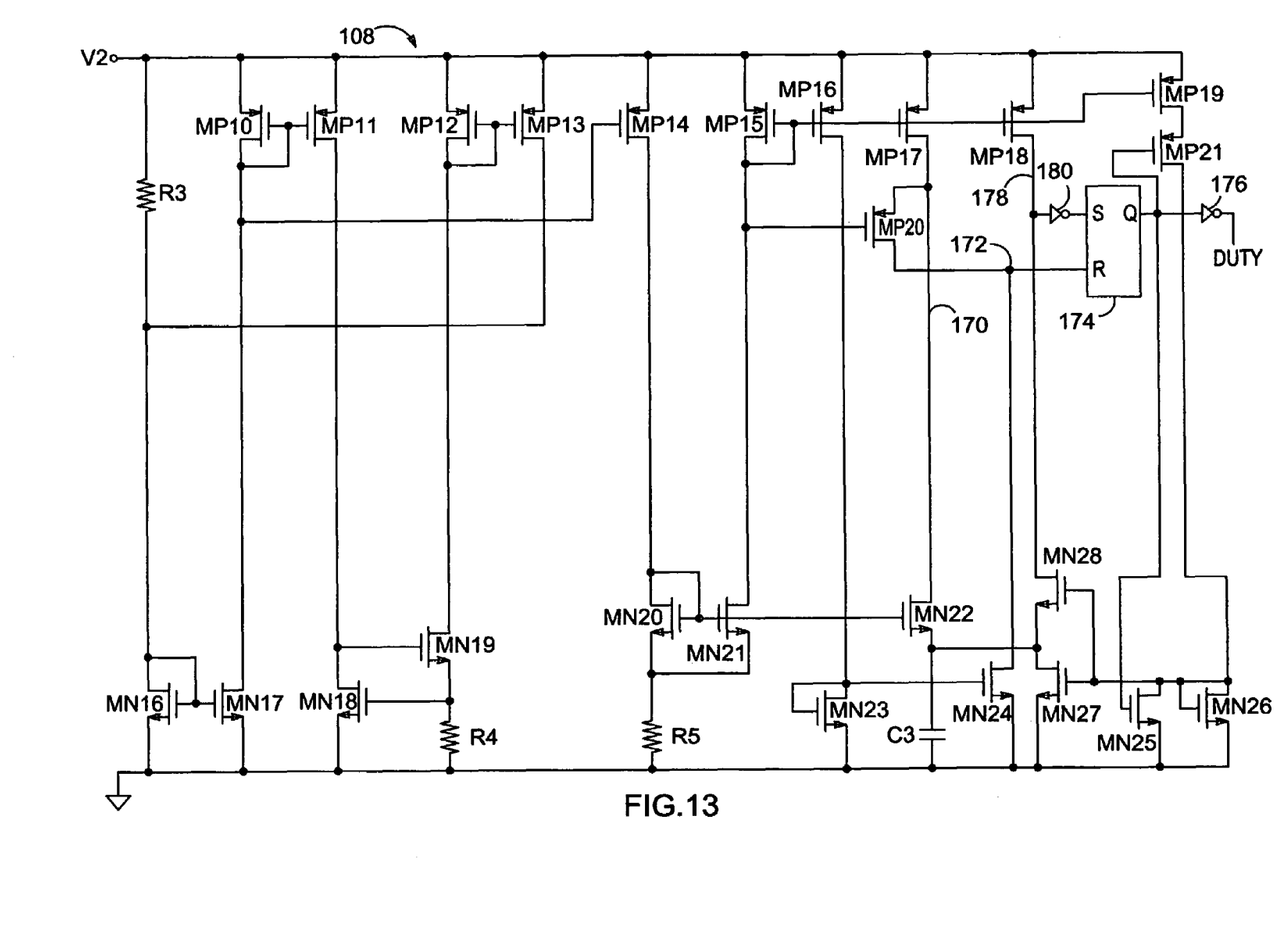
FIG. 13 is a schematic diagram of a sawtooth voltage generator and comparator as might be used with a buck controller per the present invention.

One possible embodiment of sawtooth voltage generator 108 as might be used for a buck converter is shown in FIG. 13. In order to implement the function of FIG. 12, a circuit consisting of two resistors (R3 and R4), and several P and N type current mirrors (MN16/MN17, MP10/MP11, MP12/MP13, and an amplifier stage made up of FETs MN18 and MN19, create a current that is equal to the ratio of V2 and R3. This current is used as the bias current for the rest of the oscillator circuit via MP14. MP14 supplies current to a current mirror comprising MN20, MN21 and MN22, which in turn which supplies current to a current mirror comprising MP15, MP16, MP17, MP18 and MP19. The current in MN20 and MN21 also flows into R5. Since the current in MN20 is equal to that in MP14 and the current in MN21 is a replica of the current in MN20, the current in R5 is equal to twice the current in MP14. MP14 is made to have half the W/L ratio of MP10; when so arranged, the current in MP14 is V2/(2*R3), and the voltage across R5 is R5*2*(V2/(2*R3)). Thus, the voltage across R5 is proportional to V2, and is given by (R5/R3)*V2. This voltage sets the trip point of the oscillator, as discussed below.

MP17 supplies current to a capacitor C3 through MN22; this current is proportional to the current in MP14. Assume that C3 starts uncharged and all transistors are biased in normal operation. Because MN22's gate is tied to the gate of MN20—which is at a voltage given by (R5/R3)*V2+the gate-source voltage of MN20—and MN22's source is at 0V, MN22 is turned on and the current supplied by MP17 flows into C3. The voltage on C3 then rises at a rate of (V2/(R3*4))/C3. When the voltage at the source of MN22 is equal to that at the source on MN20, the currents in MN20 and MN22 will be equal. As soon as the voltage on C3 rises above the voltage at the source of MN20—which is the same as the voltage across R5—the current in MN22 will be lower than that in MP17, and the "trip" node 170 rises. When the trip node rises high enough, MP20—whose source is tied to the "trip" node and gate is tied to the gate of MP15—will turn on and redirect the current from MP17 to the "reset" node 172. This node is held low by a small current mirror (MN23/MN24) that is arranged to provide ¼ of the current in MP17. This causes the "reset" node to rise.

Reset node 172 going high sets the Q output of an SR flip-flop 174 low which, through an inverter 176, causes the "DUTY" node to go high. This also turns on MP21 and turns off MN25, which causes a current from MP19 to flow into a current mirror comprising MN26 and MN27. MN27's drain is connected to the top plate of C3. The transistors are preferably sized such that the current in MN27 is 4 times that of the current in MP19, which is 4 times the current in MP17. Thus, C3 is discharged rapidly to a voltage close to ground. As the voltage on C3 approaches zero, MN28—whose gate is tied to MN26 and source is tied to C3—turns on and redirects MN27's current from C3 to the drain of MP18. Since MP18 has no other current to oppose it, its drain will be close to the supply voltage. The redirected current will drive node 178 low. This will then drive the input of an inverter 180 low and drive the "set" input of flip-flop 174 high. This causes the Q output of flip-flop 174 to go high, which turns off MP21, turns on MN25, and drives DUTY low. When MN26 is turned off, MN27 is also turned off, and both C3 and the drain of MP18 are allowed to go high and the cycle starts over again.

Note that the frequency with which this happens depends on R5 and C3 only. The trip point is reached when the voltage across R5 is equal to the voltage across C3. Assuming current mirror ratios as discussed above, (R5/R3)*V2=V2*T/(8*R3*C3), where T is the period. Solving for T: T=8*R5*V2*R3*C1/(R3*V2)=8*R5*C3.

Although period T remains the same no matter the value of V2, the trip point varies with V2 in a similar manner as discussed in paragraphs [0024] to [0029] above. Thus, the "gain" of the Vcomp to V1 conversion equals $1/\alpha$.

The wide ranging current mirror used deserves some attention. Referring to FIG. 13, the drain current of MN16 is the sum of the current through R3 and the drain current from MP13. MN16 and MN17 are preferably matched, so that the drain current of MN17 equals the drain current of MN16. This current is mirrored to MN18 via the MP10/MP11 current mirror. MN18 and MN19 form a feedback arrangement where the drain of MN18 and the gate of MN19 rise until the drain current of MN18 matches the drain current of MP11. Since MN18 and MN16 are matched, their gate-source voltages are also equal. This voltage ($V_{gs1}$) is forced across R4 by MN19. The drain current of MN19 is then equal to $V_{gs1}$/R4. This current is mirrored via MP12/MP13 to become part of the MN16 drain current. Thus, the current in MN16 is the current through R3+$V_{gs1}$/R4.

The current through R3 is (V2–$V_{gs1}$)/R3. Summing the currents, the drain current through MN16 is [(V2–$V_{gs1}$)/R3+$V_{gs1}$/R4]. If R3=R4=R, then the drain current of MN16 becomes V2/R. If MP14 is matched to MP10, the drain current of MP14 is equal to the drain current of MN16, which is equal to V2/R. Additional PMOS devices can be added to create scaled replicas of the current in MP10.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A controller for a power conversion circuit which includes an inductor having its first terminal coupled to a first power voltage V1 and its second terminal switched so that it alternately connects to a second, higher, power voltage V2 or to a common terminal of the two power voltages, said controller comprising:

a sawtooth voltage generator which produces a ramp voltage $V_{ramp}$ having a period T and an amplitude which may be varied in response to a first control voltage Vx; and a voltage comparator arranged to compare $V_{ramp}$ to a second control voltage Vy, the output of the comparator arranged to control the switching of said second inductor terminal so as to divide period T into a first interval t1 during which said second terminal is connected to said common terminal and a second interval t2 during which said second terminal is connected to V2;

such that when said Vy is maintained in a fixed proportion to V1, V2 will be driven so as to be in the same proportion to Vx, independently of changes in V1, and alternatively when Vx is maintained in a fixed proportion to V2, V1 will be driven to be in the same proportion to Vy, independently of changes in V2.

2. The controller of claim 1, wherein said second power voltage V2 is provided to said power conversion circuit as an input voltage and V1 is said conversion circuit's output voltage, said first control voltage Vx maintained in fixed proportion to V2 such that V1 is driven to be in the same proportion to Vy, independently of changes in V2.

3. The controller of claim 2, wherein said switching network comprises:

a diode connected between said second inductor terminal and said common terminal; and a transistor connected between said second inductor terminal and V2.

4. The controller of claim 2, further comprising a means of providing an error signal which varies with the difference between V1 and a reference voltage, said first control voltage Vx varying with said error signal such that V1 is stabilized at a desired voltage.

5. The controller of claim 1, wherein said first power voltage V1 is provided to said power conversion circuit as an input voltage and V2 is said conversion circuit's output voltage, said second control voltage Vy maintained in fixed proportion to V1 such that V2 is driven to be in the same proportion to Vx, independently of changes in V1.

6. The controller of claim 5, wherein said switching network comprises:
a diode connected between said second inductor terminal and V2; and
a transistor connected between said second inductor terminal and said common terminal.

7. The controller of claim 5, further comprising a means of providing an error signal which varies with the difference between V2 and a reference voltage, said first control voltage Vx varying with said error signal such that V2 is stabilized at a desired voltage.

8. The controller of claim 1, wherein said switching network comprises:
a first transistor connected between said second inductor terminal and V2; and
a second transistor connected between said second inductor terminal and said common terminal, such that said power conversion circuit is a synchronous converter.

9. The controller of claim 1, wherein $V_{ramp}$ toggles between a lower voltage and a higher voltage, said sawtooth voltage generator arranged such that $V_{ramp}$ steps up from said lower voltage to said higher voltage and ramps back down to said lower voltage during each period T.

10. The controller of claim 1, wherein $V_{ramp}$ toggles between a lower voltage and a higher voltage, said sawtooth voltage generator arranged such that $V_{ramp}$ steps down from said higher voltage to said lower voltage and ramps back up to said higher voltage during each period T.

11. The controller of claim 1, wherein said sawtooth generator comprises an oscillator arranged such that the slope of $V_{ramp}$ is proportional to said amplitude, such that T is invariant with changes in Vx.

12. The controller of claim 11, wherein said oscillator comprises:
a P-type current mirror referred to a positive supply voltage and arranged to mirror a current applied to its input to a first node;
an N-type current mirror referred to a circuit common point and arranged to mirror a current applied to its input to a second node;
a resistor (R1) connected at its first and second terminals to the inputs of said P-type and N-type current mirrors, respectively, the current $I_R$ in said resistor mirrored to said first and second nodes and developing voltages $V_{R1}$ and $V_{R2}$ at said first and second terminals, respectively, said oscillator arranged such that the voltage across said resistor varies with Vx;
a third node;
a capacitor connected between said third node and said circuit common point;
a means for providing a current for discharging said capacitor to said third node which is proportional to $I_R$;
a means for providing a current for charging said capacitor to said fifth node which is proportional to $I_R$;
a first transistor having its control input connected to said third node and its current circuit connected between said first node and said circuit common point; and
a second transistor having its control input connected to said third node and its current circuit connected between said second node and said positive supply voltage, said oscillator arranged such that the output of said first transistor toggles when the voltage at said third node crosses $V_{R2}$ and the output of said second transistor toggles when the voltage at said third node crosses $V_{R1}$;
a switch arranged to block at least one of said charging and discharging currents when open; and
a means for operating said switch such that said third node oscillates between approximately $V_{R1}$ and approximately $V_{R2}$, such that the period of oscillation is independent of the voltage across said resistor, said third node providing said ramp voltage $V_{ramp}$.

13. The controller of claim 12, wherein said means for providing a discharging current comprises a third transistor connected to mirror a current proportional to $I_R$ to said third node, and said means for providing a charging current comprises a fourth transistor connected to mirror a current proportional to $I_R$ to said third node.

14. The controller of claim 13, wherein said means for operating said switch comprises a flip-flop having an output, said controller arranged such that said flip-flop toggles said output when the voltage at said third node increases to $V_{R2}$ and when the voltage at said third node falls to $V_{R1}$, said flip-flop output connected to operate said switch.

15. The controller of claim 12, further comprising:
a third transistor having its current circuit connected in series between the input of said P-type current mirror and said first resistor terminal; and
a fourth transistor having its current circuit connected in series between said switch and said third node, the control inputs of said third and fourth transistors connected together, said third and fourth transistors arranged such that a voltage applied to said control inputs establishes the peak voltage to which said third node oscillates.

16. The controller of claim 15, wherein one of V1 and V2 provides said power conversion circuit's output voltage, further comprising an error amplifier which produces an output that varies with the difference between said output voltage and a reference voltage, said error amplifier output coupled to the control inputs of said third and fourth transistors such that the peak voltage to which said third node oscillates is varied as necessary to achieve an approximately constant output voltage.

17. The controller of claim 16, said controller arranged such that said error amplifier receives said reference voltage and a signal representative of said output voltage at respective inputs such that said error amplifier output varies with the difference between said reference voltage and said representative signal.

18. The controller of claim 1, wherein one of V1 and V2 provides said power conversion circuit's output voltage, further comprising circuitry arranged such that said controller provides current mode control of said power conversion circuit's output voltage.

* * * * *